(12) United States Patent
Tang et al.

(10) Patent No.: US 11,496,493 B2
(45) Date of Patent: Nov. 8, 2022

(54) DYNAMIC TRANSACTION GRAPH ANALYSIS

(71) Applicant: NEC Laboratories America, Inc., Princeton, NJ (US)

(72) Inventors: LuAn Tang, Pennington, NJ (US); Jingchao Ni, Princeton, NJ (US); Wei Cheng, Princeton Junction, NJ (US); Haifeng Chen, West Windsor, NJ (US); Dongjin Song, Princeton, NJ (US); Bo Zong, West Windsor, NJ (US); Wenchao Yu, Plainsboro, NJ (US)

(73) Assignee: NEC Corporation

( * ) Notice: Subject to any disclaimer, the term of this patent is extended or adjusted under 35 U.S.C. 154(b) by 544 days.

(21) Appl. No.: 16/565,746

(22) Filed: Sep. 10, 2019

(65) Prior Publication Data

US 2020/0092316 A1     Mar. 19, 2020

Related U.S. Application Data

(60) Provisional application No. 62/733,281, filed on Sep. 19, 2018.

(51) Int. Cl.
| | |
|---|---|
| *H04L 29/06* | (2006.01) |
| *H04L 9/40* | (2022.01) |
| *G06F 16/901* | (2019.01) |
| *G06K 9/62* | (2022.01) |

(52) U.S. Cl.
CPC ...... *H04L 63/1425* (2013.01); *G06F 16/9024* (2019.01); *G06K 9/6218* (2013.01)

(58) Field of Classification Search
CPC ............ H04L 63/1425; G06F 16/9024; G06K 9/6218; G06N 3/04
See application file for complete search history.

(56) References Cited

U.S. PATENT DOCUMENTS

| | | | |
|---|---|---|---|
| 2011/0252032 A1 | 10/2011 | Fitzgerald et al. | |
| 2018/0069885 A1* | 3/2018 | Patterson | .............. G06F 21/554 |
| 2018/0152468 A1 | 5/2018 | Nor et al. | |

OTHER PUBLICATIONS

Cao et al., "Financial Forecasting Using Support Vector Machines", Neural Computing & Applications. May 1, 2001. vol. 10, Issue 2. pp. 184-192.

Chen et al., "Comparison of support-vector machines and back propagation neural networks in forecasting the six major Asian stock markets", International Journal of Electronic Finance. vol. 1, Issue 1. Jan. 1, 2006. pp. 19-67.

(Continued)

*Primary Examiner* — Jeffrey C Pwu
*Assistant Examiner* — Thong P Truong
(74) *Attorney, Agent, or Firm* — Joseph Kolodka (57) ABSTRACT

Systems and methods for implementing dynamic graph analysis (DGA) to detect anomalous network traffic are provided. The method includes processing communications and profile data associated with multiple devices to determine dynamic graphs. The method includes generating features to model temporal behaviors of network traffic generated by the multiple devices based on the dynamic graphs. The method also includes formulating a list of prediction results for sources of the anomalous network traffic from the multiple devices based on the temporal behaviors.

20 Claims, 9 Drawing Sheets

(56) References Cited

OTHER PUBLICATIONS

Chitra et al., "Data Mining Techniques and its Applications in Banking Sector", International Journal of Emerging Technology and Advanced Engineering. Aug. 2013. vol. 4, Issue 8. pp. 219-226.
Kyoung-Jae Kim, "Financial time series forecasting using support vector machines", Neurocomputing. Sep. 1, 2003. vol. 55. pp. 307-319.
Tsaih et al., "Forecasting S&P 500 stock index futures with hybrid AI system", Decision Support Systems. Jun. 1, 1998. vol. 23, Issue 2. pp. 161-174.

* cited by examiner

FIG. 9

DYNAMIC TRANSACTION GRAPH ANALYSIS

RELATED APPLICATION INFORMATION

This application claims priority to U.S. Provisional Patent Application No. 62/733,281, filed on Sep. 19, 2018, incorporated herein by reference herein its entirety.

BACKGROUND

Technical Field

The present invention relates to deep learning and more particularly to applying deep learning for the detection of entities that exceed a predetermined threshold.

Description of the Related Art

Deep learning is a machine learning method based on artificial neural networks. Deep learning architectures can be applied to fields including computer vision, speech recognition, natural language processing, audio recognition, social network filtering, machine translation, bioinformatics, drug design, medical image analysis, material inspection and board game programs, etc. Deep learning can be supervised, semi-supervised or unsupervised.

SUMMARY

According to an aspect of the present invention, a method is provided for implementing dynamic graph analysis (DGA) to detect anomalous network traffic. The method includes processing communications and profile data associated with multiple devices to determine dynamic graphs. The method includes generating features to model temporal behaviors of network traffic generated by the multiple devices based on the dynamic graphs. The method also includes formulating a list of prediction results for sources of the anomalous network traffic from the multiple devices based on the temporal behaviors.

According to another aspect of the present invention, a system is provided for implementing dynamic graph analysis (DGA) to detect anomalous network traffic. The system includes a processor device operatively coupled to a memory device. The processor device processes communications and profile data associated with multiple devices to determine dynamic graphs. The processor device generates features to model temporal behaviors of network traffic generated by the multiple devices based on the dynamic graphs. The processor device also formulates a list of prediction results for sources of the anomalous network traffic from the multiple devices based on the temporal behaviors.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided to/for dynamic graph analysis (DGA) to automatically generate features based on temporal graphs for characterizing the temporal behaviors of network traffic and supervising the detection of anomalies.

In one embodiment, the systems implement a dynamic graph analysis engine (DGAE) based on a dynamic graph mining model. The DGAE models key behaviors of temporal graph by generating multiple features (for example, more than 1500 features). In example embodiments, the features can be grouped in four categories. (1) Static one-hop features: this group include degree-based features of the nodes in each snapshot of the series of graphs. (2) Dynamic one-hop features: this group include dynamic features of the nodes in consecutive graphs. (3) Static multi-hop features: this group include path and community-based features of the nodes in each snapshot of the series of graphs. (4) Dynamic multi-hop features: this group include dynamic path and community-based features in consecutive graphs. The systems and methods can implement a feature pool that is very rich, which is beneficial to measure and quantify the temporal behaviors of a networked system, and is effective for detecting anomalies via training robust classification models.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
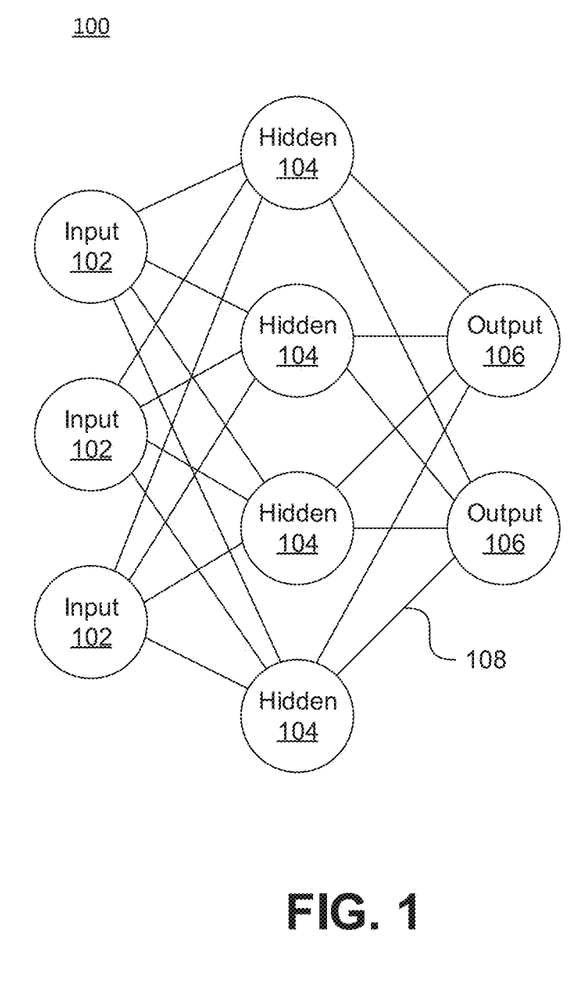
FIG. 1 is a generalized diagram of a neural network, in accordance with an embodiment of the present invention.

Referring now to the drawings in which like numerals represent the same or similar elements and initially to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. In example embodiments herein, the training data can include network traffic including anomalous network traffic. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
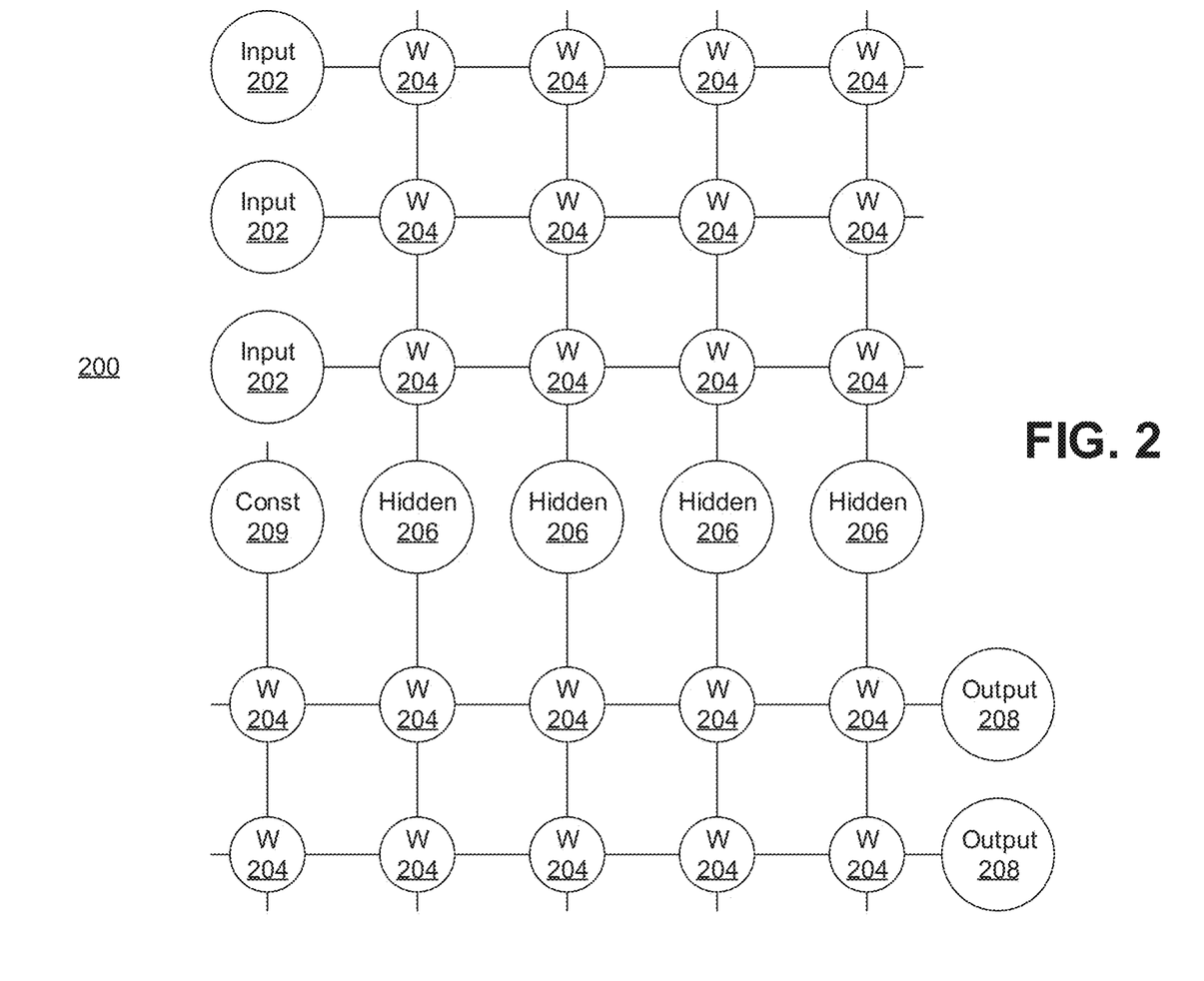
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

The ANN 200 can be applied to implement DGA to detect anomalous network traffic. ANN 200 can perform DGA to extract features for characterizing temporal behavior of anomalous network traffic, as described with respect to FIG. 3 and system 300 herein below. The extracted features can then be used to detect anomalous network traffic.

Figure 3:
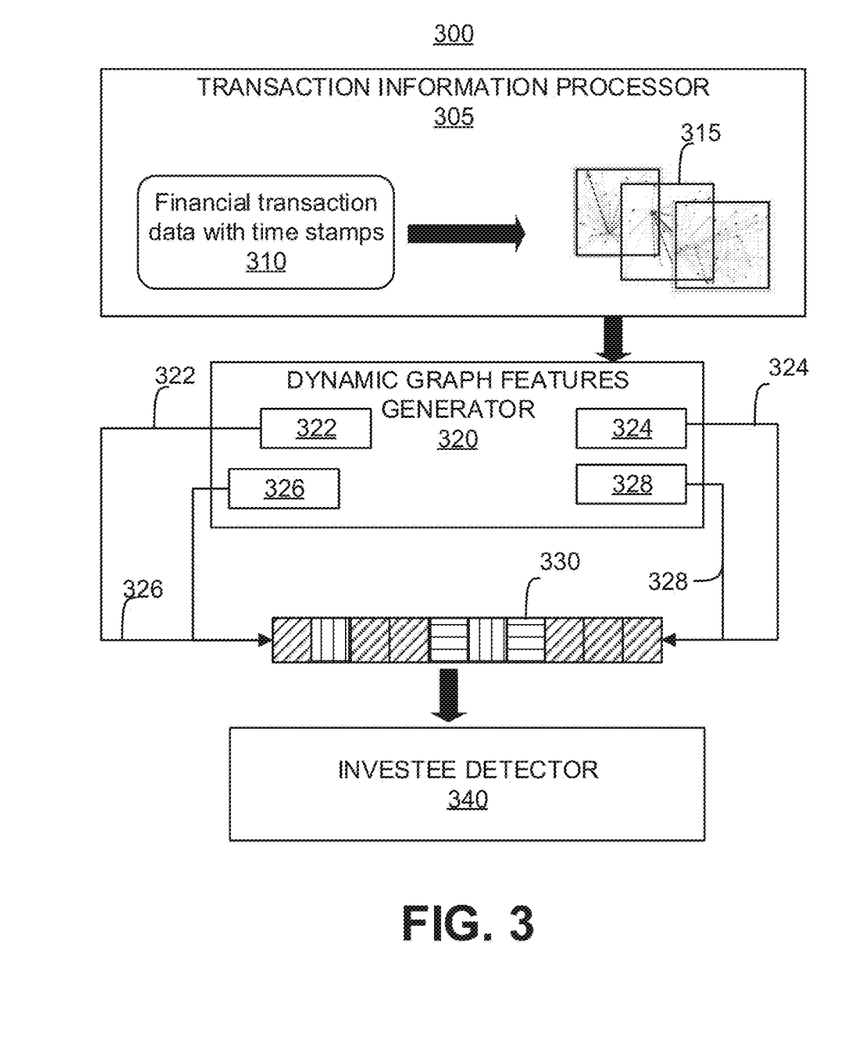
FIG. 3 is a block diagram illustrating a system that implements dynamic graph analysis (DGA) to anomalous network traffic, in accordance with an embodiment of the present invention.

Referring now to FIG. 3, a block diagram illustrating a system 300 for implementing DGA to extract features for characterizing temporal behavior of (normal and) anomalous network traffic, in accordance with example embodiments.

System 300 detects anomalous network traffic (for example, in an enterprise network). System 300 allows an accurate estimation of network performance thereby increasing the efficiency and probable success of an enterprise network. In some instances, enterprise networks can include millions of network connections that are monitored by security system periodically (for example, in every minute). System 300 allows a system administrator to effectively analyze the traffic data collected on the network connections and timely report anomalous utility of the network sources (therefore increasing the quality of performance of the network). System 300 enables a traffic model that efficiently captures the characteristics of process data on the network traffic and allows performance evaluation of networked systems. System 300 implements a temporal graph-based process to characterize anomalous network traffic data and enable supervised detection of anomalous and suspicious connections based on the historical network traffic data from system logs. In general, given the network's historical records, system 300 predicts whether a node could be anomalous in near future (e.g., in one week).

FIG. 3 shows an architecture of system 300. System 300 can be referred to as a dynamic graph analysis engine (DGAE) (for example, a computing engine or device for performing DGA) and can include an input pre-processor 305, a dynamic graph features generator 320 and an anomalous device detector 340.

System 300 models the flow of communications by a graph, which can be dynamic (for example constantly changing, reacting to changes in the underlying information, etc.). In example graphs, each node can be a server, for example, a device, and an edge can represent communications flowing from one of its ending nodes to another. The edge can be associated with a weight indicating an amount of data in that communication. The example graphs can evolve (for example, change) from time to time and shape a series of dynamic graphs 315. System 300 uses the graph data for detection of anomalous network traffic. System 300 designs (for example, effective) temporal graph features to characterize devices.

Input pre-processor 305 processes (for example, performs preprocessing of) input data of historical records (for example, from a database). Input pre-processor 305 can remove incomplete and duplicate data (and otherwise prepare (for example, "clean") the data for analysis). Input pre-processor 305 implements identifier (ID) matching in order to extract all valid data generating dynamic graphs 315. Each edge of the graphs 315 encodes the correlation from one communication node to another. Input pre-processor 305 can generate graphs in different (temporal) resolutions, e.g., hourly, daily, weekly, monthly graphs and yearly graphs. Input pre-processor 305 can also generate statistics about the graphs 315, such as number of nodes, number of edges, number of connected components, etc., for the analysis of the data.

After preprocessing, each graph 315 is represented as $G_i(V_i, E_i)$, where $G_i$ is the graph at time point i, $V_i$ represents the set of nodes in $G_i$, $E_i$ represents the set of edges in $G_i$. The dynamic graphs 315 are represented by a series of graphs $G_1, \ldots, G_T$, where T is the total number of time points in the data.

Dynamic graph features generator 320 can generate multiple features (for example from one to in excess of 1,500 features) to characterize the temporal behaviors of devices and network traffic. In accordance with an example, dynamic graph features generator 320 can implement four primary groups of features, which are (1) static one-hop features: this group include degree-based features of the nodes in each snapshot of the series of graphs; (2) dynamic one-hop features: this group includes dynamic features of the nodes in consecutive graphs; (3) static multi-hop features: this group include path and community-based features of the nodes in each snapshot of the series of graphs; and (4) dynamic multi-hop features: this group include dynamic path and community-based features in consecutive graphs. The groups of features can be implemented respectively by static one-hop features (for example, module, device or component) 322, dynamic one-hop features 324, static multi-hop features 326, and dynamic multi-hop features 328, as described herein below with reference, respectively, to FIGS. 4 to 7.

Anomalous device detector 340 receives (for example, testing) data and extracts (for example, the four groups of) features as specified/directed by static one-hop features 322, dynamic one-hop features 324, static multi-hop features 326, and dynamic multi-hop features 328. Anomalous device detector 340 applies DGA using the features to detect anomalous network traffic, for example, as described herein below with respect to FIG. 8.

Figure 4:
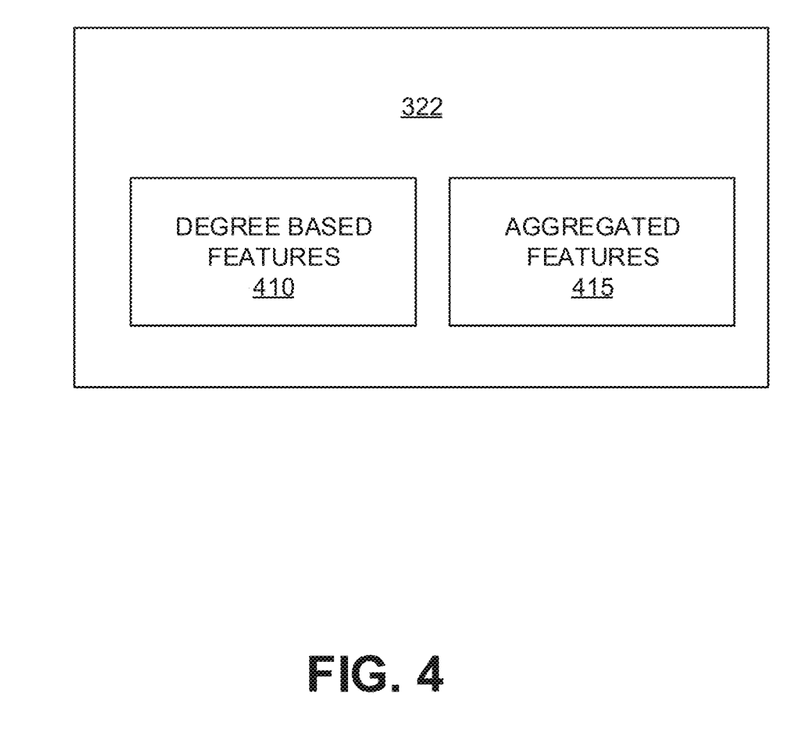
FIG. 4 is a block diagram illustrating a dynamic graph features generator, in accordance with an embodiment of the present invention.

FIG. 4 is a block diagram illustrating a static one-hop features 322, in accordance with example embodiments.

As shown in FIG. 4, static one-hop features 322 includes degree-based features 410 and aggregated features 415. The degree-based features 410 and aggregated features 415 allow measurement and quantification of the temporal behaviors of network traffic and are effective for detecting anomalous devices via training robust classification models.

For each node (for example, device or server) static one-hop features 322 can automatically generate degree-based features 410 in each snapshot of the dynamic graphs, which can include in-degree, out-degree, total degree, degree difference, weighted in-degree, weighted out-degree, weighted total degree, and weighted degree difference features.

The in-degree (feature) refers to the number of in-going edges associated with each node. The out-degree (feature) refers to the number of out-going edges associated with each node. The total degree (feature) refers to the sum of in-degree and out-degree. Degree difference (feature) refers to the difference between out-degree and in-degree. The weighted in-degree (feature) refers to the sum of weights on in-going edges associated with each node. The weighted out-degree (feature) refers to the sum of weights on out-going edges associated with each node. The weighted total degree (feature) refers to the sum of weighted in-degree and weighted out-degree. The weighted degree difference (feature) refers to the difference between weighted out-degree and weighted in-degree.

For each node, static one-hop features 322 can automatically generate aggregated features 415, which can include a maximal value of each of the degree-based features 410 of the monthly snapshots in each year. Aggregated features 415 can include a minimal value of each of the degree-based features 410 of the monthly snapshots in each year. Aggregated features 415 can include a mean value of each of the degree-based features 410 of the monthly snapshots in each year. Aggregated features 415 can include a variance of each of the degree-based features 410 of the monthly snapshots in each year. Aggregated features 415 can include a sum of each of the degree-based features 410 of the monthly snapshots in each year.

Figure 5:
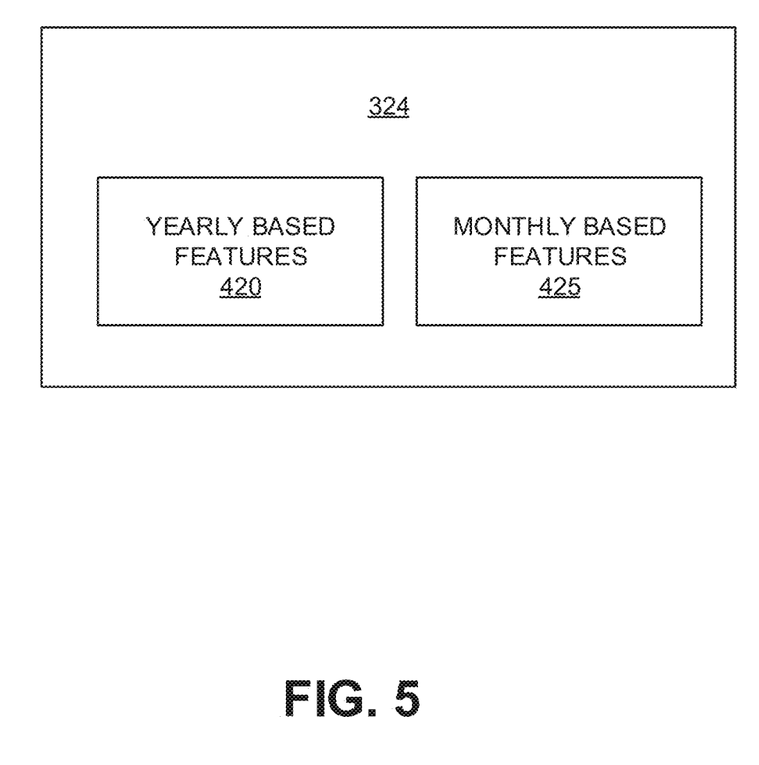
FIG. 5 is a block diagram illustrating a static one-hop features component, in accordance with an embodiment of the present invention.

FIG. 5 is a block diagram illustrating a dynamic one-hop features 324, in accordance with example embodiments.

For each node, dynamic one-hop features 324 can (for example, automatically) generate dynamic degree features in a series of graphs, which can be summarized as yearly based ratio features 420 and monthly based ratio features 425.

Yearly based ratio features 420 include an in-degree ratio, which is determined by dividing a next year by a current year (for example, next year/current year, for an in-degree). Yearly based ratio features 420 also include an out-degree ratio, which is determined by dividing a next year by a current year (for example, next year/current year, for an out-degree). Yearly based ratio features 420 include a total degree ratio, which is determined by dividing a next year by a current year (for example, next year/current year, for a total degree). Degree difference ratio is determined by dividing a next year by a current year (for example, next year/current year, for a degree difference). Yearly based ratio features 420 include a weighted in-degree ratio, which is determined by dividing a next year by a current year (for example, next year/current year, for a weighted in-degree). Yearly based ratio features 420 include a weighted out-degree ratio: next year/current year. Yearly based ratio features 420 further include a weighted total degree ratio, which is determined by dividing a next year by a current year (for example, next year/current year, for a weighted total degree). Weighted degree difference ratio is determined by dividing a next year by a current year (for example, next year/current year, for a weighted degree difference).

Monthly based ratio features 425 include an in-degree ratio, which is determined by dividing a next month by a current month (for example, next month/current month, for an in-degree). Monthly based ratio features 425 include an out-degree ratio, which is determined by dividing a next month by a current month (for example, next month/current month, for an out-degree). Monthly based ratio features 425 include a total degree ratio, which is determined by dividing a next month by a current month (for example, total degree ratio: next month/current month). Monthly based ratio features 425 include a degree difference ratio, which is determined by dividing a next month by a current month (for example, degree difference ratio: next month/current month). Monthly based ratio features 425 include a weighted in-degree ratio, which is determined by dividing a next month by a current month (for example, weighted in-degree ratio: next month/current month). Monthly based ratio features 425 include a weighted out-degree ratio, which is determined by dividing a next month by a current month (for example, weighted out-degree ratio: next month/current month). Monthly based ratio features 425 include a weighted total degree ratio, which is determined by dividing a next month by a current month (for example, weighted total degree ratio: next month/current month). Monthly based ratio features 425 include a weighted degree difference ratio, which is determined by dividing a next month by a current month (for example, weighted degree difference ratio: next month/current month).

Note that the above features can also be generated in different time spans, for example, half-year wise and quarter-wise.

Figure 6:
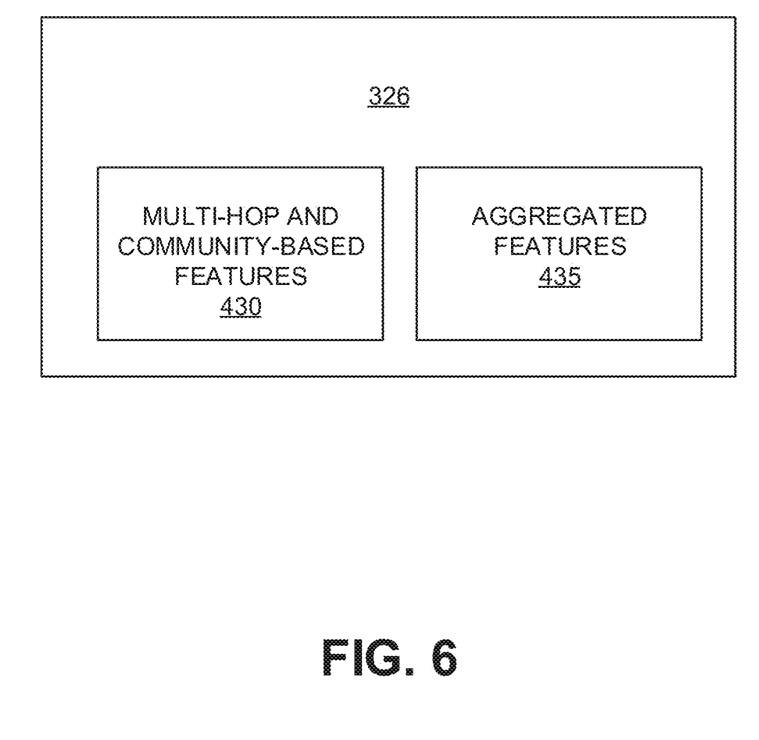
FIG. 6 is a block diagram illustrating a dynamic one-hop features component, in accordance with an embodiment of the present invention.

FIG. 6 is a block diagram illustrating a static multi-hop features 326, in accordance with example embodiments.

For each node, for example, device, static multi-hop features 326 can (for example, automatically) generate multi-hop and community-based features 430 in each snapshot of the dynamic graphs, which are summarized as following.

Ego-net size indicates the number of edges in the ego-net (ego network) of each node. Ego networks consist of a focal node ("ego") and the nodes to whom ego is directly connected to (for example, "alters") plus the ties, if any, among the alters. Each alter in an ego network has their own ego network, and all ego networks interlock to form a (for example, human) social network. Weighted ego-net size is the sum of edge weights in the ego-net of each node. A clustering coefficient indicates the percentage of triangles in the ego-net of each node. A pagerank counts the number and quality of paths to a node to determine an estimate of how important the node is. Here each "path" consists of multiple links. If two nodes are connected by one link, there is a one-hop path between them. If node 1 connects to node 2, and node 2 connects to node 3, then node 1 and 3 are connected by a two-hop path. Pagerank-2 indicates a 2 hop pagerank score of each node. Pagerank-3 indicates a 3 hop pagerank score of each node. Pagerank-converge indicates the convergent pagerank score of each node.

Static multi-hop features 326 can (for example, automatically) generate aggregated features 435. These include a maximal value of each of the multi-hop and community-based features 430 of the monthly snapshots in each year. Aggregated features 435 also include a minimal value of each of the multi-hop and community-based features 430 of the monthly snapshots in each year. Aggregated features 435 include a mean value of each of the multi-hop and community-based features 430 of the monthly snapshots in each year. Aggregated features 435 also include a variance of each of the multi-hop and community-based features 430 of the monthly snapshots in each year. Aggregated features 435 also include a sum of each of the multi-hop and community-based features 430 of the monthly snapshots in each year.

Figure 7:
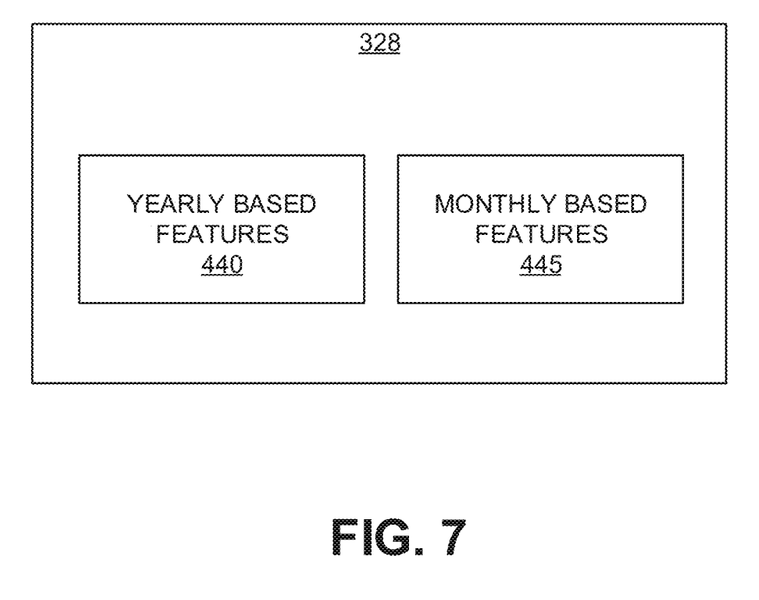
FIG. 7 is a block diagram illustrating a static multi-hop features component, in accordance with an embodiment of the present invention.

FIG. 7 is a block diagram illustrating dynamic multi-hop features 328, in accordance with example embodiments.

For each node, for example, device, dynamic multi-hop features 328 can (for example, automatically) generate dynamic multi-hop and community-based features in a series of graphs. These include yearly based ratio features 440 and monthly based ratio features 445, which are summarized as following.

Yearly based ratio features 440 include features such as an ego-net size ratio, which is an ego-net size ratio: next year/current year (for example, an ego-net size for a next year over a current year). Weighted ego-net ratio is a ratio of weighted ego for a next year/current year (for example, a weighted ego-net for a next year over a current year). Clustering coefficient ratio is a ratio of clustering coefficient for a next year/current year. Pagerank-2 ratio is a ratio of pagerank-2 for a next year/current year. Pagerank-3 ratio is a ratio of pagerank-3 for a next year/current year. Pagerank-converge ratio is a ratio of pagerank-converge for a next year/current year.

Monthly based ratio features include features such as an ego-net size ratio, which is a ratio of ego-net for a next month/current month. Weighted ego-net ratio is a ratio of weighted ego for a next month/current month. Clustering coefficient ratio is a ratio of clustering coefficient for a next month/current month. Pagerank-2 ratio is a ratio of pagerank-2 for a next month/current month. Pagerank-3 ratio is a ratio of pagerank-3 for a next month/current month. Pagerank-converge ratio is a ratio of pagerank-converge for a next month/current month.

Note that the above yearly based ratio features 440 and monthly based ratio features 445 can also be generated in different time increments, such as half-year wise and quarter-wise.

Figure 8:
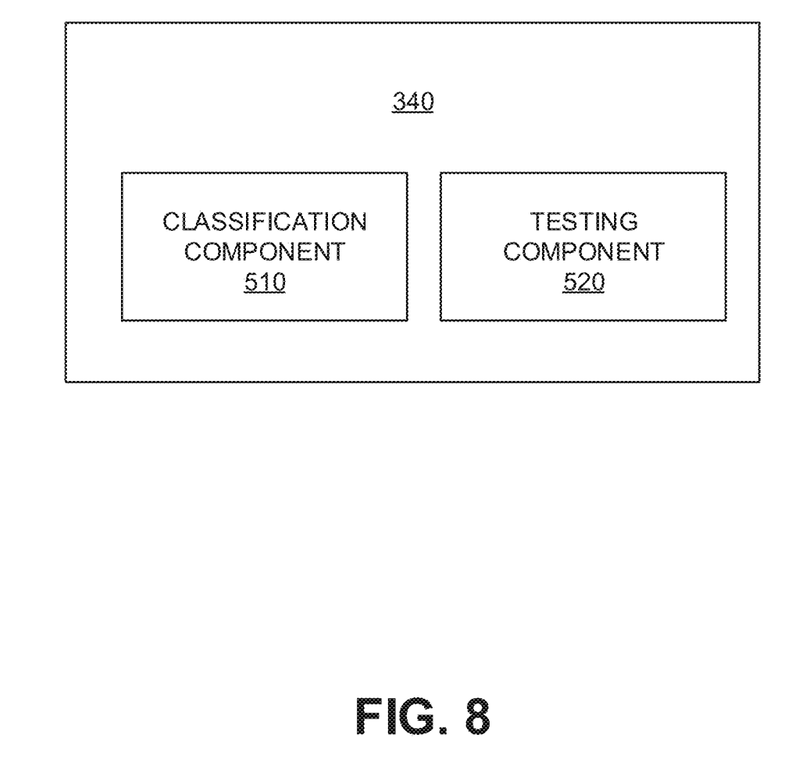
FIG. 8 is a block diagram illustrating a dynamic multi-hop features component, in accordance with an embodiment of the present invention.

FIG. 8 is a block diagram illustrating an anomalous device detector (module, device or component, etc.) 340, in accordance with example embodiments.

As shown in FIG. 8, anomalous device detector 340 includes a classification component 510 and a testing component 520.

Classification component 510 receives the (for example, four groups of, as described herein above with respect to FIGS. 4 to 7) features of training data and concatenates these features for each data instance. Classification component 510 then feeds the training data into a classifier (for example, a classifying process implemented by the system, neural network or device), such as decision tree, a support vector machine (SVM) and/or gradient boosting classifier, for model training. Classification component 510 outputs a trained model that can be used to detect anomalous network traffic based on testing data.

Testing component 520 receives testing data and extracts the (for example, four groups of) features, for example, as specified in/by static one-hop features 322, dynamic one-hop features 324, static multi-hop features 326, and dynamic multi-hop features 328. Testing component 520 then, in some instances, concatenates these features and feeds the data to the trained (for example, well-trained) model from classification component 510 for anomalous network traffic detection. The combination of features and interaction of features can be used to detect anomalous traffic. Testing component 520 may output a list of prediction result, in which, according to an example, value 1 indicates that a device is anomalous and value 0 indicates that a node is normal. In some embodiments, the threshold for anomaly can be adjusted so that nodes are identified with varying standard and/or probability (for example, a lower probability than a previous higher threshold) of anomalous behavior.

Referring back to FIG. 3, system 300 can implement anomalous network traffic detection based on the processes and features described herein above with respect to static one-hop features 322 (FIG. 4), dynamic one-hop features 324 (FIG. 5), static multi-hop features 326 (FIG. 6), and dynamic multi-hop features 328 (FIG. 7). System 300 can reduce the complexity of the task of anomalous network traffic detection.

System 300 can automatically generate rich features based on dynamic graphs for detecting anomalous network traffic. System 300 manages (contends, accounts for, etc.) the dynamics of graph data. The graphs can change from time to time, and system 300 can determine the changes on a periodic basis, such as an hourly, a daily, weekly, monthly or yearly basis. System 300 analyzes the change of communications (or system logs) to determine whether these changes reflect that the anomalies in network traffic will grow above a predetermined target (or not). System 300 quantifies the dynamic change for effective detection.

System 300 also effectively manages (contends, accounts for, etc.) imbalanced data distribution. According to example embodiments, the number of anomalous devices is much smaller than that of others (for example, significantly outweighed by the number of devices that do not achieve a minimum threshold of anomalous behavior). In the data, the distribution can be highly biased, with a small percentage (for example, about 2%, 5%, 10%, etc.) of anomalous devices (or sources of network traffic) in a common group, and therefore system 300 implements the anomalous network traffic detection as an imbalanced classification. System 300 can accurately find a small portion of devices among a large group (for example, in big graphs).

System 300 also effectively manages (contends, accounts for, etc.) incomplete data. Therefore, system 300 can implement anomalous network traffic detection based on a partial view about the communications from network traffic sources, including those that are relatively small.

System 300 also effectively manages (contends, accounts for, etc.) large (for example, big) data size. In example embodiments, graphs can have a large plurality (for example, millions) of nodes and (for example, billions of) edges. Additionally, the evolution can generate multiple (for example, tens, hundreds, etc.) of such graphs changing over time. System 300 can derive features and perform detection efficiently for large data sets, for example, such as in tens of thousands of nodes in minutes.

System 300 also effectively manages (contends, accounts for, etc.) large candidate pools. System 300 can be oriented towards finding particular types of anomalous network traffic, which shapes a large candidate pool. The candidate pool can include many (for example, millions of) devices, a large number (for example, most) of which have incomplete data problems. System 300 can perform detection with an accuracy to an acceptable degree of certainty for a large candidate pool.

System 300 also allows effective interpretation of results. The results can be presented in a format that allows system administrators to effectively analyze the results. The results can be presented with criteria for classification (for example, a minimum expected anomalous behavior) and a degree of certainty that is readily understandable to an end user.

System 300 can capture hidden temporal behaviors that are not available in individual communications but are available in the (for example, aggregated) network traffic from the devices. System 300 provides a very rich pool of graph features, thus can significantly facilitate robust classification processes that can automatically select most useful ones from the pool. System 300 provides features that facilitate robust classification processes that can deal with imbalanced data distribution.

Figure 9:
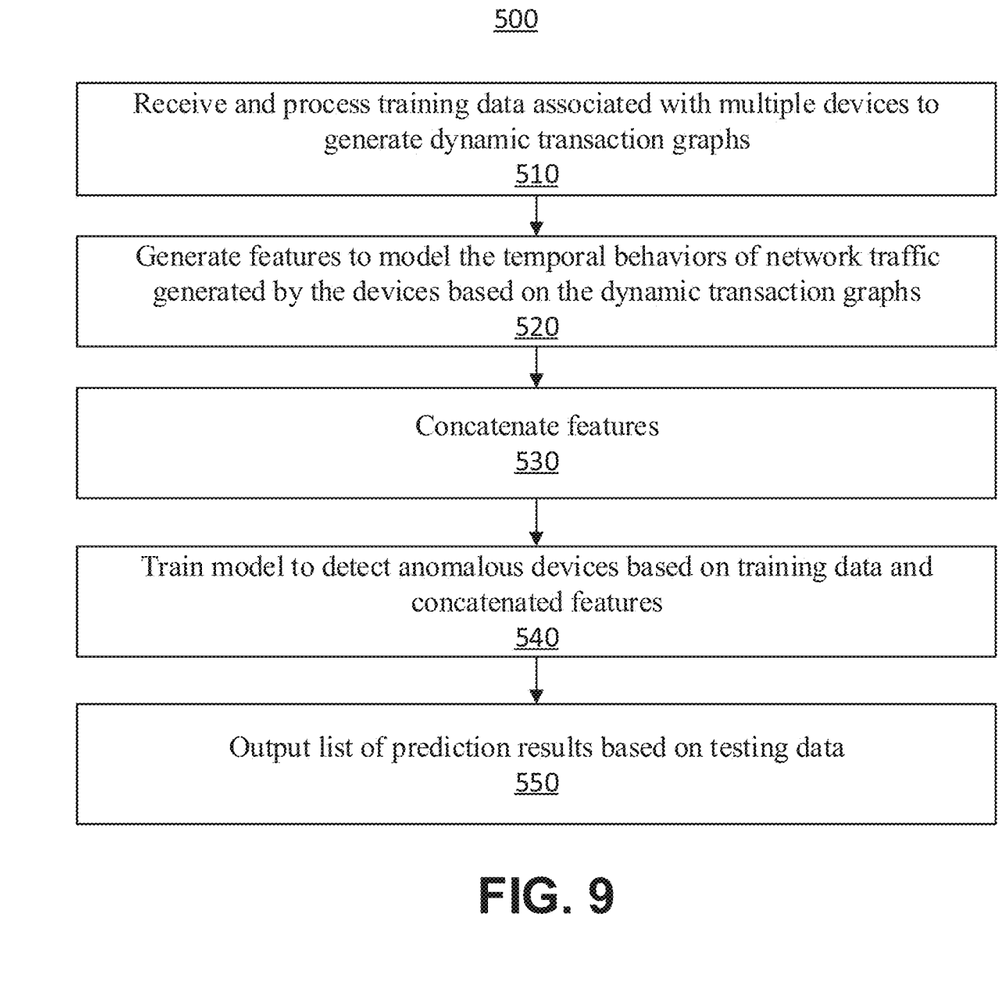
FIG. 9 is a flow diagram illustrating a method of implementing dynamic graph analysis (DGA) to detect anomalous network traffic, in accordance with an embodiment of the present invention.

FIG. 9 is a flow diagram illustrating a method 500 of implementing dynamic graph analysis (DGA) to detect anomalous network traffic, in accordance with the present invention.

At block 510, system 300 receives and processes communication and profile data associated with multiple devices to determine dynamic graphs. System 300 can receive data including historical records in the database. System 300 can remove incomplete and duplicate data. System 300 can perform id matching to extract all valid data for generating dynamic graphs. Each edge of the dynamic graphs encodes the correlation from one communication node to another.

At block 520, system 300 generates temporal features to characterize (for example, model) the temporal behaviors of anomalous network traffic based on the dynamic graphs. System 300 can generate features from dynamic graph data to model the key temporal behaviors of anomalous network traffic. For example, system 300 can generate groups of features including static one-hop features, dynamic one-hop features, static multi-hop features and dynamic multi-hop features. In this example, the graph features belong to four major groups, which complementarily provide rich information to characterize the anomalous network traffic. The features can be hidden features that are not available in individual communications but are available in the network traffic from the devices.

At block 530, system 300 concatenates the features and can group devices (or sources of network traffic) into different classes based on their weighted degrees. System 300 can, in some instances, provide more accurate results for classes with higher degree ranges. Generally, devices in high degree range are more active and have sufficient data and less missing information, thus system 300 can make better prediction on these devices than devices in low degree range. The system 300 can thereby reduce noise in the data and improve the robustness of the results. By grouping devices into different degree ranges, the system 300 can provide results with different confidence levels. For those in high-degree range, the system 300 can provide more accurate results since there is enough information to decide. For those in low-degree range, system 300 can report the results with the lower confidence indicating that information in this group contains more noisy information and missing information. Therefore, system 300 can reduce noise in lower degree ranges from higher degree ranges. In some embodiments there can be more than two groups, with the grouping based on different ranges of degrees.

At block 540, system 300 feeds training data into a classifier, such as decision tree, SVM, gradient boosting classifier, etc., for model training. System 300 determines (and trains) a model that can detect anomalous network traffic.

At block 550, system 300 formulates and outputs a list of prediction results that can include sources of anomalous network traffic from the multiple devices. For example, in an example embodiment value 1 indicates that a node is anomalous and value 0 indicates that a node is normal. In an example embodiment, the results can be further classified in different bands (for example, highly anomalous, normal but showing signs of minor anomalous behavior). The system 300 can provide a good interpretation of the results and also enable efficient detection.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing dynamic graph analysis (DGA) to detect anomalous network traffic, comprising:
   processing historical transactions of bank accounts and profile data associated with a plurality of devices to determine at least one dynamic graph;
   generating, by a processor device, a plurality of features to model temporal behaviors of network traffic generated by the plurality of devices based on the at least one dynamic graph, the plurality of features grouped into a static one-hop feature group, a dynamic one-hop feature group, a static multi-hop feature group, and a dynamic multi-hop feature group; and
   formulating a list of prediction results for sources of anomalous network traffic from the plurality of devices based on the temporal behaviors,
   wherein the static one-hop feature group includes degree-based features of nodes in each snapshot of a series of graphs, the dynamic one-hop feature group includes dynamic features of the nodes in consecutive graphs, the static multi-hop feature group includes path and community-based features of the nodes in each snapshot of the series of graphs, and the dynamic multi-hop feature group includes dynamic path and community-based features in consecutive graphs.

2. The method as recited in claim 1, wherein the static one-hop feature group includes an in-degree feature, an out-degree feature, and a total degree feature, the in-degree feature pertaining to a number of out-going edges associated with each node, the out-degree feature pertaining to a number of out-going edges associated with each node, and the total degree feature pertaining to a sum of the in-degree feature and the out-degree feature.

3. The method as recited in claim 1, wherein the static one-hop feature group includes a weighted in-degree feature, a weighted out-degree feature, and a weighted total degree feature, the weighted in-degree feature pertaining to a sum of weights on in-going edges associated with each node, the weighted out-degree feature pertaining to a sum of weights on out-going edges associated with each node, and the weighted total degree feature pertaining to a difference between the weighted in-degree feature and the weighted out-degree feature.

4. The method as recited in claim 1, wherein the static one-hop feature group includes aggregated features.

5. The method as recited in claim 4, wherein the aggregated features include a maximum value of each of the in-degree feature, the out-degree feature, and the total degree feature of monthly snapshots in each year, a minimum value of each of the in-degree feature, the out-degree feature, and the total degree feature of monthly snapshots in each year, and a mean value of each of the in-degree feature, the out-degree feature, and the total degree feature of monthly snapshots in each year.

6. The method as recited in claim 1, wherein the dynamic one-hop feature group includes:

an ego-net-based feature, a clustering feature, a pagerank-based feature and an aggregated feature.

7. The method as recited in claim 6, wherein the dynamic one-hop feature group further includes:
a degree-based feature, a weighted degree-based feature and an aggregated feature.

8. The method as recited in claim 1, wherein the static multi-hop feature group includes:
at least one degree-based feature, at least one weighted degree-based feature and at least one aggregated feature.

9. The method as recited in claim 1, wherein the static multi-hop feature group includes a 2-hop pagerank score for each node, a 3-hop pagerank score for each node, and a pagerank converge feature being a convergent pagerank score of each node.

10. The method as recited in claim 1, wherein the dynamic multi-hop feature group includes:
an ego-net-based feature, a clustering feature, and a pagerank-based feature.

11. The method as recited in claim 1, wherein outputting the list of prediction results based on the plurality of features further comprises:
detecting at least one anomalous device using a trained model based on the at least one of the plurality of features.

12. A computer system for implementing dynamic graph analysis (DGA) to detect anomalous network traffic, comprising:
a processor device operatively coupled to a memory device, the processor device being configured to:
process historical transactions of bank accounts and profile data associated with a plurality of devices to determine at least one dynamic graph;
generate a plurality of features to model temporal behaviors of network traffic generated by the plurality of devices based on the at least one dynamic graph, the plurality of features grouped into a static one-hop feature group, a dynamic one-hop feature group, a static multi-hop feature group, and a dynamic multi-hop feature group; and
formulate a list of prediction results for sources of anomalous network traffic from the plurality of devices based on the temporal behaviors,
wherein the static one-hop feature group includes degree-based features of nodes in each snapshot of a series of graphs, the dynamic one-hop feature group includes dynamic features of the nodes in consecutive graphs, the static multi-hop feature group includes path and community-based features of the nodes in each snapshot of the series of graphs, and the dynamic multi-hop feature group includes dynamic path and community-based features in consecutive graphs.

13. The system as recited in claim 12, wherein the static one-hop feature group includes an in-degree feature, an out-degree feature, and a total degree feature, the in-degree feature pertaining to a number of out-going edges associated with each node, the out-degree feature pertaining to a number of out-going edges associated with each node, and the total degree feature pertaining to a sum of the in-degree feature and the out-degree feature.

14. The system as recited in claim 13, wherein the static one-hop feature group includes a weighted in-degree feature, a weighted out-degree feature, and a weighted total degree feature, the weighted in-degree feature pertaining to a sum of weights on in-going edges associated with each node, the weighted out-degree feature pertaining to a sum of weights on out-going edges associated with each node, and the weighted total degree feature pertaining to a difference between the weighted in-degree feature and the weighted out-degree feature.

15. The system as recited in claim 12, wherein the static one-hop feature group includes aggregated features.

16. The system as recited in claim 15, wherein the aggregated features include a maximum value of each of the in-degree feature, the out-degree feature, and the total degree feature of monthly snapshots in each year, a minimum value of each of the in-degree feature, the out-degree feature, and the total degree feature of monthly snapshots in each year, and a mean value of each of the in-degree feature, the out-degree feature, and the total degree feature of monthly snapshots in each year.

17. The system as recited in claim 12, wherein the dynamic one-hop feature group includes:
an ego-net-based feature, a clustering feature, a pagerank-based feature and an aggregated feature.

18. The system as recited in claim 17, wherein the dynamic one-hop feature group further includes:
a degree-based feature, a weighted degree-based feature and an aggregated feature.

19. The system as recited in claim 12, wherein the static multi-hop feature group includes a 2-hop pagerank score for each node, a 3-hop pagerank score for each node, and a pagerank converge feature being a convergent pagerank score of each node.

20. A computer program product for implementing dynamic graph analysis (DGA) to detect anomalous network traffic, the computer program product comprising a non-transitory computer readable storage medium having program instructions embodied therewith, the program instructions executable by a computing device to cause the computing device to perform the method comprising:
processing historical transactions of bank accounts and profile data associated with a plurality of devices to determine at least one dynamic graph;
generating, by the computing device, a plurality of features to model temporal behaviors of network traffic generated by the plurality of devices based on the at least one dynamic graph, the plurality of features grouped into a static one-hop feature group, a dynamic one-hop feature group, a static multi-hop feature group, and a dynamic multi-hop feature group; and
formulating a list of prediction results for sources of anomalous network traffic from the plurality of devices based on the temporal behaviors,
wherein the static one-hop feature group includes degree-based features of nodes in each snapshot of a series of graphs, the dynamic one-hop feature group includes dynamic features of the nodes in consecutive graphs, the static multi-hop feature group includes path and community-based features of the nodes in each snapshot of the series of graphs, and the dynamic multi-hop feature group includes dynamic path and community-based features in consecutive graphs.

* * * * *